April 19, 1949.　　　　G. AGINS　　　　2,467,646
COMPUTER APPARATUS
Original Filed July 18, 1940

*INVENTOR.*
GEORGE AGINS
BY Campbell, Brumbaugh & Free
*HIS ATTORNEYS.*

Patented Apr. 19, 1949

2,467,646

UNITED STATES PATENT OFFICE 2,467,646

COMPUTER APPARATUS

George Agins, Brooklyn, N. Y., assignor to Arma Corporation, Brooklyn, N. Y., a corporation of New York Original application July 18, 1940, Serial No. 346,183. Divided and this application December 6, 1946, Serial No. 714,609

7 Claims. (Cl. 235—61)

This invention relates to computers and has particular reference to electromechanical computers for electrically resolving trigonometric functions from variable angles and radii.

This application is a division of my copending application, Serial No. 346,183, filed July 18, 1940, for Computer, now abandoned.

In accordance with the invention, a potential or induction regulator comprising relatively movable rotor and stator, each having independent windings in space quadrature, is utilized as an electric resolver, the rotor being displaced in accordance with an angular input, and potential input is impressed on one of the windings for resolving or composing the input factors trigonometrically to produce output voltages which may be converted into proportional angular displacements of a member at a corresponding rate and through corresponding angular or linear distance.

It will be seen that, by means of the electromechanical computer of this invention, a resultant vector may be resolved into two mutually perpendicular component vectors; that, conversely, two mutually perpendicular vectors may be composed into a resultant vector. The computer may also be utilized to obtain from angular displacements voltages which are proportional to the trigonometric functions of the angles of displacement. The output of the computer is accordingly available either for actuating an indicator, to provide data for use in further calculations, or for energizing or actuating follow-up means for effecting the positioning of mechanical members by other driving means, or for directly driving another computer or a mechanical member, and the like.

For a more complete understanding of the invention, reference may be had to the accompanying drawings, in which.

Figure 1:
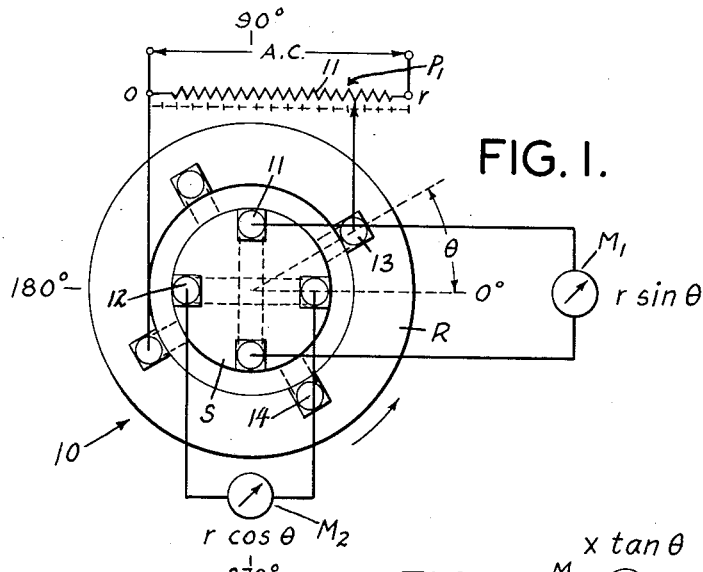
Figure 1 illustrates a potential regulator utilized as an electric resolver in accordance with this invention for continuously providing voltages proportional to functions of angular displacement angles between the rotor and stator thereof.

Referring to Figure 1 of the drawings, numeral 10 designates a potential or induction regulator comprising a drum-shaped laminated iron rotor R rotatable about a cylindrical laminated iron stator S. Positioned in slots in the stator S are two independent windings 11 and 12 in space quadrature. Similarly positioned in slots on the inner surface of the rotor R are two independent windings 13 and 14 in space quadrature.

The potential regulator 10 so constructed is used as an electric resolver by rotating the rotor R relatively to the stator S to change the mutual inductance between the primary and secondary windings. The rotor R may be revolved by a shaft, gearing or the like. In the embodiment shown, rotor winding 13 is utilized as the primary winding and the two stator windings 11 and 12 serve as the secondary windings. The null rotor winding 14 is not used in this case. Thus, as is indicated diagrammatically in Figure 1, the magnitude of the alternating current voltage $r$ which is applied to the primary winding 13 from any suitable source such as the potentiometer $P_1$, for example, is representative of the radius input to the resolver, and the angular displacement of the rotor R from its zero or non-inductive position is the angle $\theta$ input to the resolver. For simplicity, the maximum ratio of voltage transformation between the rotor and stator windings is considered to be 1 to 1, but obviously other ratios may be used as desired or required.

In operation of the arrangement of Figure 1 with a mechanical input of angle $\theta$, and an electrical input representative of radius $r$ from the potentiometer $P_1$, the mutual inductance between the primary winding 13 and the secondary windings 11, 12, of the potential regulator 10, produces an alternating current voltage equal to $r \sin \theta$ across the terminals of secondary winding 11 which may be indicated by any suitable indicating instrument $M_1$, for example, and also simultaneously produces an alternating current voltage equal to $r \cos \theta$ across the terminals of secondary winding 12, which may be indicated by any suitable indicating instrument $M_2$, for example. It will be understood that the secondary voltages are always practically in time phase with, or in time phase opposition to, the primary voltage, depending upon the sign of the sine and cosine functions of the angle $\theta$.

Figure 2:
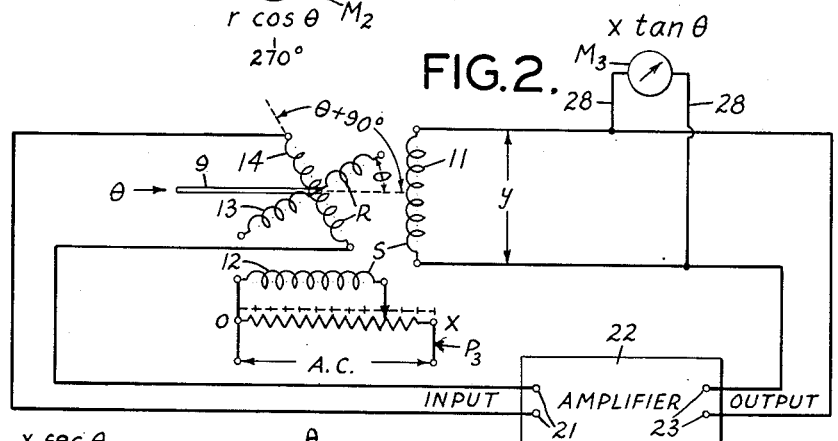
Figure 2 is a schematic illustration of an arrangement of this invention for continuously obtaining a voltage proportional to the tangent function of an angular input.

Figure 2 illustrates an arrangement utilizing the potential regulator 10 for obtaining the function $x \tan \theta$, where the electrical input voltage $x$ is applied to the stator winding 12 as shown, from a suitable potentiometer $P_2$, for example.

The null winding 14 of regulator 10 is connected to the input terminals 21 of the electronic amplifier 22, the output terminals of which are connected to the terminals of stator winding 11. The electronic amplifier 22 may be of any suitable high gain type.

In operation of the arrangement of Figure 2, if rotor R of regulator 10 is turned by means of shaft 9 through the angle $\theta$ from its zero position, the null winding 14 is displaced to the angle $\theta+90°$ from zero position and from stator winding 12, since winding 14 is displaced 90° from winding 13, which determines angle $\theta$. The energization of stator winding 12 at voltage $x$ from the potentiometer P3, results in induction of a voltage in null winding 14, which is impressed on amplifier 22, whose output is supplied to stator winding 11 of the regulator 10.

Due to the inverse feed-back connections of the amplifier 22 to the regulator 10, the resultant voltage induced in the rotor winding 14 by reason of energization of stator windings 11 and 12 will be zero if the voltage applied to stator winding 11 is equal to $x \tan \theta$. However, inasmuch as zero voltage in null winding 14 causes zero input to amplifier 22, the resultant voltage induced in null winding 14 must be a small value which causes the amplified voltage applied to stator winding 11 to differ by a small amount from the ideal $x \tan \theta$ voltage. This small voltage difference depends upon the gain of the amplifier 22, and when a high gain amplifier is used, the error is of negligible magnitude. Accordingly, for all practical purposes, the output voltage $y$ of the amplifier 22 is proportional to $x \tan \theta$ and may be indicated by any suitable indicating instrument M3 connected to the take-off connections 28 in Figure 2. As may be illustrated by the following equations:

$$y \sin (\theta+90°) + x \cos (\theta+90°) = 0$$
$$y \cos \theta - x \sin \theta = 0$$
$$y = x \frac{\sin \theta}{\cos \theta} = x \tan \theta$$

Similarly, if the output of amplifier 22 is applied to stator winding 12 instead of to winding 11, and is of magnitude $x$, and an electrical input of $y$ is supplied to stator winding 11, it follows that the output voltage of the amplifier 22 is proportional to $y \cot \theta$, as is shown by the following equations:

$$y \sin (\theta+90°) + x \cos (\theta+90°) = 0$$
$$y \cos \theta - x \sin \theta = 0$$
$$x = y \frac{\cos \theta}{\sin \theta} = y \cot \theta$$

The electrical output in either case, $x \tan \theta$ or $y \cot \theta$ may be utilized for proportionately energizing a motor for actuating an indicator or other mechanical element, or for controlling a follow-up mechanism, or as an electrical input of that value to subsequent computing or calculating mechanism, or the like.

Figure 3:
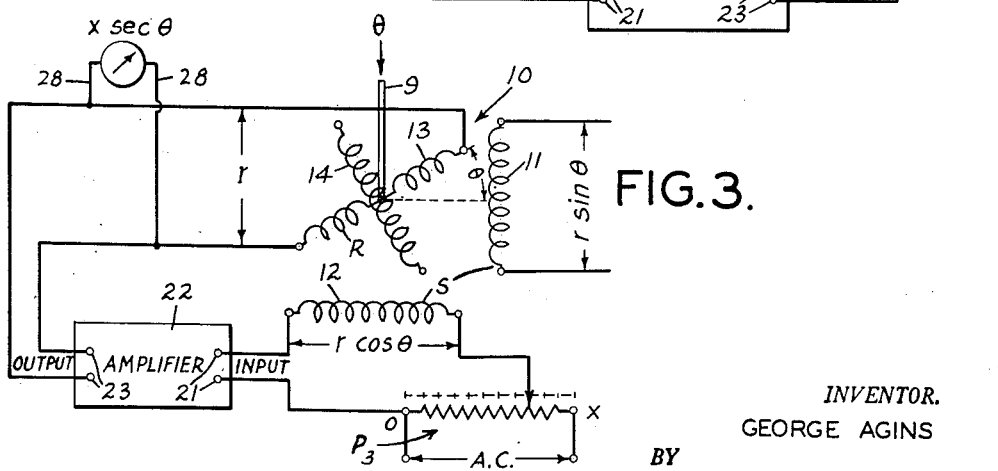
Figure 3 is a schematic illustration of an arrangement of this invention for continuously obtaining a voltage proportional to the secant function of an angular input.

Figure 3 illustrates an arrangement for obtaining the function $x \sec \theta$ where $x$ is the electrical input from the potentiometer P3, for example, and is connected in series opposition with the stator winding 12 of regulator 10 and in series with the input terminals 21 of electronic amplifier 22, whose output $r$ is impressed on the winding 13 of rotor R of regulator 10.

In operation of the arrangement of Figure 3, the rotor R of regulator 10 is rotated by means of shaft 9 through the angle $\theta$ from zero position. The voltage induced in stator winding 12 as the result of energization of rotor winding 13 is proportional to $r \cos \theta$, which opposes the input voltage $x$ supplied from the potentiometer P3. Thus, when $r \cos \theta$ voltage becomes equal to $x$ input voltage, the input to amplifier 22 is zero. However, the $r \cos \theta$ voltage must differ from $x$ input voltage by a small amount in order that the amplifier 22 will produce any output $r$ voltage. Since the amplifier 22 is of the high gain type, the error in the value of $r$ is of negligible magnitude, and the output voltage of the amplifier is proportional to $x \sec \theta$ as is shown by the following equations:

$$x = r \cos \theta$$
$$r = \frac{x}{\cos \theta} = x \sec \theta$$

Similarly, if, in Figure 3, the electrical input is impressed on stator winding 11 instead of on stator winding 12, and the input voltage applied to the series circuit has a magnitude $y$, the output voltage $r$ of the amplifier 22 is proportional to $y \csc \theta$, as is shown by the following equations:

$$y = r \sin \theta$$
$$r = \frac{y}{\sin \theta} = y \csc \theta$$

Accordingly, with the various arrangements illustrated, and equivalents or obvious modifications thereof, many trigonometric functions in terms of output voltages may be continuously obtained, as well as displacements of mechanical elements from trigonometric voltage inputs and the like. As indicated, the computer of this invention has wide and varied application for continuously solving problems incident to variable angle and vector determination and for continuously developing mechanical movements or displacements, such as for gun fire control purposes.

Although certain preferred embodiments of the invention have been illustrated and described herein, it is to be understood that the invention is not limited thereby, but is susceptible of changes in form and detail within the scope of the appended claims.

I claim:

1. An electromechanical computer for electrically making computations involving a resultant vector, the rectangular component vectors of said resultant vector, and an angle between said resultant vector and one of said component vectors, the combination of a potential regulator having at least two windings capable of relative movement with respect to one another, high gain electric amplifying means interposed between said two windings and connected to provide inverse feedback between the output and input of said amplifying means through the inductive coupling between said windings, means for producing a relative displacement between said two windings in accordance with said angle between the resultant vector and one of said component vectors, means for introducing into the circuit of one of said windings a voltage that is a function of one of said vectors, and an output circuit connected to the output terminals of said amplifying means.

2. In an electromechanical computer for electrically making computations involving a resultant vector, the rectangular component vectors of said resultant vector, and an angle between said resultant vector and one of said component vectors, the combination of a potential regulator having a pair of windings disposed in space quadrature with respect to one another and having another winding capable of relative movement with respect to said pair, electrical means supplying an alternating current representative of one of said vectors to one of the windings of said pair, high gain electric amplifying means receiving an input from said another winding and supplying an output to the other winding of said pair and connected to provide inverse feedback between the output and input of said amplifying means through the inductive coupling between said another winding and the other winding of said pair, an output circuit connected to the other winding of said pair, and means for producing a relative displacement between said pair of windings and said another winding in accordance with said angle between the resultant vector and one of said component vectors, whereby the input to the other winding of said pair which is supplied by said output is representative of another of said vectors.

3. In an electromechanical computer for electrically making computations involving a resultant vector, the rectangular component vectors of said resultant vector, and an angle between said resultant vector and one of said component vectors, the combination of a potential regulator having a pair of windings capable of relative angular displacement with respect to one another, electrical means for supplying to one of the windings of said pair an alternating current representative of one of said vectors, high gain amplifier means receiving an input from the circuit of said one winding and supplying an output to the other winding of said pair and connected to provide inverse feedback between the output and input of said amplifier means through the inductive coupling between said windings, an output circuit connected to said other winding, and means for producing relative angular displacement of said windings in accordance with said angle between the resultant vector and one of said component vectors.

4. In an electromechanical computer, the combination of a potential regulator comprising relatively movable primary and secondary transformer members, one of which has at least one winding and the other of which has two windings in space quadrature, means for energizing one of said two windings, means for displacing the other member a predetermined angle, whereby there is induced in said one winding a voltage proportional to a trigonometric function of the angle of displacement, and means responsive to said induced voltage for developing a substantially equal voltage to balance the same, the response of said last-named means being in accordance with said displacement.

5. In an electromechanical computer, the combination of a potential regulator comprising relatively movable primary and secondary transformer members, one of which has one winding and the other of which has two windings in space quadrature, means for energizing one of said two windings, means for displacing the other member a predetermined angle to induce a corresponding voltage in said one winding, an amplifier, connections between said one winding and the input of said amplifier, and means for impressing the output of said amplifier on the other of said two windings for inducing a secondary voltage in said one winding which is equal to a trigonometric function of the displacement of said other member.

6. In an electromechanical computer, the combination of a potential regulator comprising relatively movable primary and secondary transformer members, one of which has one winding and the other of which has two windings in space quadrature, means for energizing one of said two windings, means for displacing the other member a predetermined angle, to induce a corresponding voltage in said one winding, a high gain electronic amplifier, connections between said one winding and the input to said amplifier, and connections between the output of said amplifier and the other of said two windings, whereby the voltage induced in said one winding is zero when the voltage applied to the other of said two windings is equal to a function of the angle of displacement of said other member.

7. In an electromechanical computer, the combination of a potential regulator comprising relatively movable primary and secondary transformer members, each having at least one winding, an amplifier, a source of input voltage connected in series opposition with one of said windings and in series with the input to said amplifier, connections between the output of said amplifier and the winding for the other member, said connections providing inverse feedback between the output and input of said amplifier through the inductive coupling between said windings, and means for displacing said other member through a predetermined angle such that the voltage induced in said one winding is equal to said input voltage whereby the output voltage of said amplifier is equal to a secant function of the angle of displacement.

GEORGE AGINS.

REFERENCES CITED

The following references are of record in the file of this patent:

UNITED STATES PATENTS

| Number | Name | Date |
|---|---|---|
| 1,677,378 | Albrecht | July 17, 1928 |
| 2,080,186 | Reymond | May 11, 1937 |
| 2,109,283 | Boykow | Feb. 22, 1938 |
| 2,402,359 | Bedford | June 18, 1946 |